(12) United States Patent
Kondo et al.

(10) Patent No.: US 7,107,130 B2
(45) Date of Patent: Sep. 12, 2006

(54) VEHICLE-MOUNTED METER SYSTEM

(75) Inventors: Kazuaki Kondo, Shizuoka (JP); Shozo Ashizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/711,976

(22) Filed: Oct. 18, 2004

(65) Prior Publication Data

US 2005/0119807 A1 Jun. 2, 2005

(30) Foreign Application Priority Data

Dec. 2, 2003 (JP) .............................. 2003-402546

(51) Int. Cl.
*G06F 3/00* (2006.01)
*G05B 23/00* (2006.01)

(52) U.S. Cl. ...................... 701/1; 340/488; 307/10.1

(58) Field of Classification Search .................... 701/1; 340/488, 870.39, 459, 870.37, 425.5, 310.11; 307/10.1

See application file for complete search history.

(56) References Cited

U.S. PATENT DOCUMENTS

| | | | |
|---|---|---|---|
| 5,091,856 A | * | 2/1992 | Hasegawa et al. ............ 701/36 |
| 5,803,043 A | * | 9/1998 | Bayron et al. ............... 123/335 |
| 5,938,716 A | * | 8/1999 | Shutty et al. ............... 701/115 |
| 6,177,878 B1 | * | 1/2001 | Tamura ....................... 340/3.5 |
| 6,249,727 B1 | * | 6/2001 | Muller ........................ 701/36 |
| 6,430,488 B1 | * | 8/2002 | Goldman et al. ............. 701/36 |

FOREIGN PATENT DOCUMENTS

| | | |
|---|---|---|
| DE | 198 16 794 A1 | 10/1999 |
| DE | 101 61 768 A1 | 6/2003 |
| JP | 5-53367 | 8/1993 |
| JP | 2001-356031 | 12/2001 |
| JP | 2001-356031 A | 12/2001 |
| JP | 2003-194595 | 7/2003 |
| JP | 2003-335193 | 11/2003 |
| JP | 2003-335193 A | 11/2003 |

* cited by examiner

*Primary Examiner*—Dalena Tran
(74) *Attorney, Agent, or Firm*—Armstrong, Kratz, Quintos, Hanson & Brooks, LLP

(57) ABSTRACT

A vehicle-mounted meter system includes: an inputting and outputting circuit for data measured to show a condition of the vehicle, a control circuit for controlling the system as a whole and for procession of the data, a meter main body, and a control unit detachably attached to the meter main body. The data inputting and outputting circuit is arranged on the meter main body, and the control circuit is arranged on the control unit. Preferably, the meter main body has a random bus structure corresponding to the data inputting and outputting circuit, and the bus structure has a buffer through which communication is allowed between the data inputting and outputting circuit and the control circuit.

22 Claims, 12 Drawing Sheets

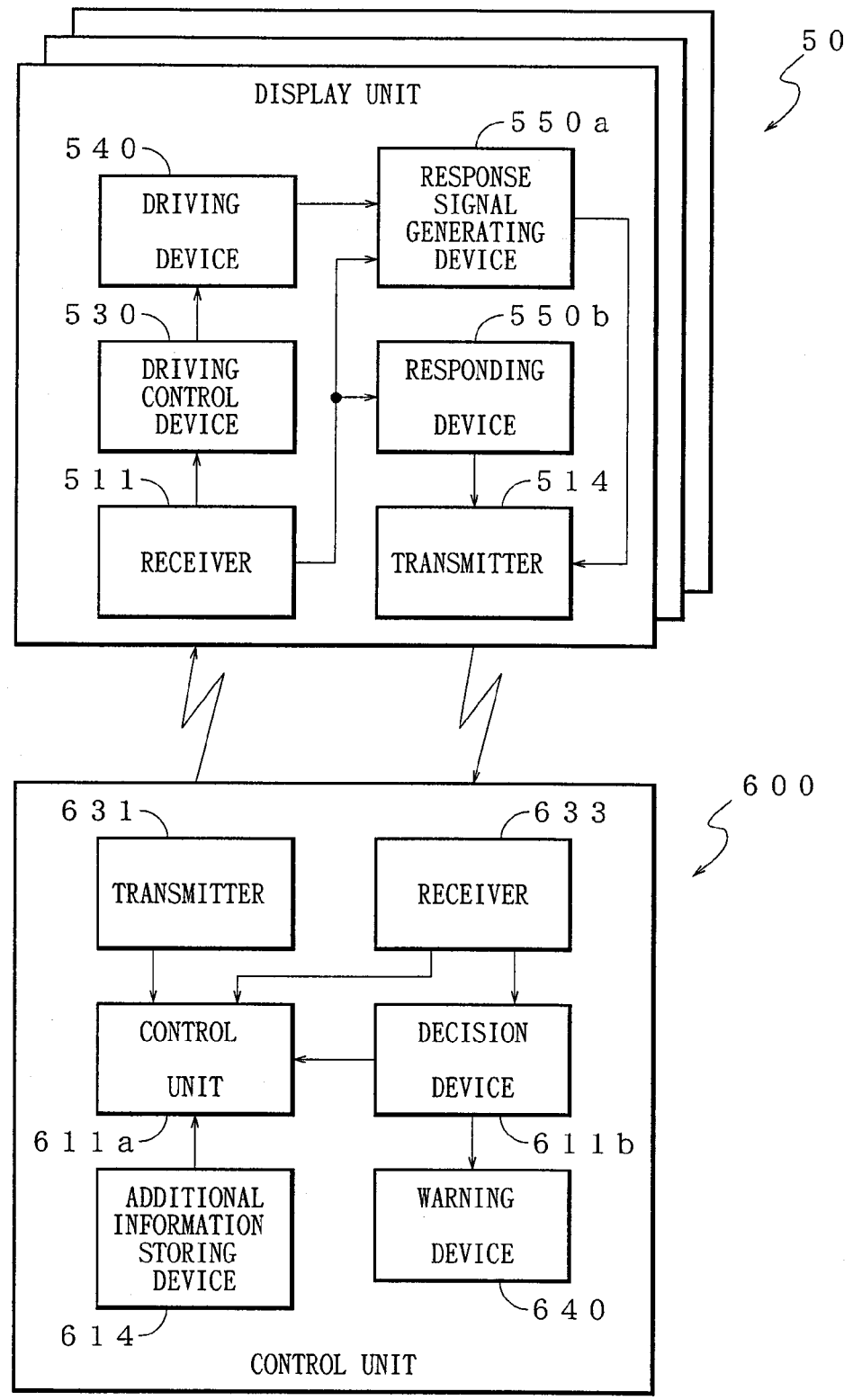
F I G. 13

VEHICLE-MOUNTED METER SYSTEM

BACKGROUND OF THE INVENTION

1. Field of the Invention

The present invention relates to a meter system applicable to meters mounted in an automotive vehicle.

2. Background Art

A conventional vehicle-mounted meter is disclosed in Japanese Patent Application Laid-open No. 2003-194595. FIG. 8 is an exploded perspective view showing a construction of the conventional meter. The meter has a dial plate 101, a light guiding plate 102, a bearing plate 103, a fore cover 104, a circuit board 105, and a rear cover 106. The dial plate 101 is elongated in a transverse direction to comply with a combination meter including meters for vehicle speed, engine revolution speed, fuel quantity, and cooling water temperature, etc. The dial plate 101 is provided with a meter scale pattern 111a for vehicle speed, engine revolution speed, fuel quantity, and cooling water temperature, a winker indication pattern 111b, a warning indication pattern 111c, etc. The meter pattern 111a is provided for a speed meter, a tachometer, a fuel meter, and a water temperature meter. The light guiding plate 102 guides light emitted from a light source element to illuminate a rear face of the dial plate 101 for the speed meter and the fuel meter. The fore cover 104 is shaped like a saucer and transversely elongated to fit the dial plate 101. The fore cover 104 is combined with the rear cover 106 so as to sandwich the circuit board 105 therebetween.

The circuit board 105 has a transversely elongated shape in the same way as the dial plate 101. The circuit board 105 has a front face arranged with a plurality of LEDs (Light Emitting Diodes) 152 to supply light for a pointer 113 and electronic parts 151 including an IC chip. The circuit board 105 has a rear face arranged with a movement 153 turning the pointer 113. The movement 153 has a pointer shaft 153a penetrating through the circuit board 105 to extend forward. Similarly, another movement 153 (not shown) is provided for the fuel meter, the tachometer, and the water temperature meter respectively. The rear cover 106 has an elongated saucer shape like the fore cover 104.

FIG. 9 is a block diagram showing a general electric configuration of a meter mounted in an automotive vehicle. In FIG. 9, a vehicle-mounted combination meter 200 has a micro computer 201, input terminals 202 to 205, 206a to 206n, I/O (input/output) circuits 207 to 210, drivers 211, 216, 220, a speed meter 212, a tachometer 213, a fuel meter 214, a water temperature meter 215, LEDs 217a to 217n, an LCD (Liquid Crystal Display) 221, an EEPROM (Electrically Erasable Programmable Read-only Memory) 222, etc.

The micro computer 201 controls the combination meter 200 as a whole. The micro computer 201 receives vehicle speed signals (SPD) through the input terminals 202 and the I/O circuit 207. The micro computer 201 also receives engine revolution signals (TACHO) through the input terminal 203 and the I/O circuit 208. The micro computer 201 further receives signals of a remaining fuel quantity (FUEL) and a water temperature (TEMP) through the input terminals 204 and 205, an I/O circuit 209, and an A/D converter 201a. The micro computer 201 further receives various warning signals, operation signals (PRNDL) of an automatic shift lever, etc. via the input terminals 206a to 206n.

The micro computer 201 controls the driver 211 to operate the speed meter 212, the tachometer 213, the fuel meter 214, and the water temperature meter 215 respectively in response to input signals of vehicle speed (SPD), engine revolution speed (TACHO), remaining fuel quantity (FUEL), and cooling water temperature (TEMP), so that each meter may indicate a value corresponding to each signal. Furthermore, the micro computer 201 controls the driver 216 to turn on or off the LEDs 217a to 217n in response to signals for various warning, automatic shift lever operation (PRNDL), etc.

Electric circuits for control of the micro computer 201 are incorporated in an integrated circuit board like the circuit board 105 shown in FIG. 8 to operate each meter. The circuits are desirably connected to the meters to operate them.

Meanwhile, for standardization of parts, another conventional in-vehicle combination meter has a control section such as a micro computer to control meters. The control section is separated from an indication section of vehicle speed, engine revolution speed, etc., and multiplex communication is applied for signal transmission between the control section and the indication section. Such combination meters are disclosed in Japanese patent preliminary publication No. H5-53367, Japanese patent application laid-open No. 2001-356031, and Japanese patent application No. 2002-142720.

FIG. 10 is an illustration showing a configuration of a vehicle mounted combination meter disclosed in Japanese patent preliminary publication No. H5-53367. The combination meter has a main body 301 and a control circuit section 302 which are separately constructed and disposed in the vehicle.

The combination meter main body 301 has a vehicle speed meter 311, an engine revolution speed meter 312, a cooling water temperature meter 313, a fuel meter 314, and a case 315 accommodating the meters. The vehicle speed meter 311, the engine revolution speed meter 312, the cooling water temperature meter 313, and the fuel meter 314 have cross-coil movements 311a to 314a, pointers 311b to 314b, dial plates 311c to 314c, and drive circuits 311d to 314d respectively. The drive circuits 311d to 314d are sequentially connected one another. The drive circuit 313d positioned at one end of the combination meter is connected to the control circuit section 302 through a signal cable 313, so that data of driving signals are supplied from the control circuit section 302 to the drive circuit 313d.

The control circuit section 302 receives signals of vehicle speed, engine revolution speed, cooling water temperature, and remaining fuel quantity through electrical wires 341 to 344 from sensors (not shown) each desirably positioned in the vehicle. Based on the signals, driving data is supplied to the combination meter main body 301 through a signal cable 303.

FIGS. 11 and 12 are respectively a sectional view and a block diagram showing a configuration of a vehicle mounted combination meter disclosed in Japanese patent application laid-open No. 2001-356031. In FIG. 11, the combination meter has an indicator board 401, a vehicle speed meter 402, a tachometer 405, a fuel meter 408 indicating a remaining quantity of fuel such as gasoline, and a water temperature meter 411. Each meter is attached on a fore surface 401a of the indicator board 401.

The vehicle speed meter 402 is constituted by a stepper motor 403 and a pointer 404. The stepper motor 403 moves the pointer 404 in response to data of vehicle speed. The tachometer 405 is constituted by a stepper motor 406 and a pointer 407. The stepper motor 406 moves the pointer 407 in response to data of engine revolution speed. The fuel meter 408 is constituted by a fuel meter 409 and a pointer 410. The fuel meter 409 moves the pointer 410 in response to data of remaining fuel quantity. The water temperature meter 411 is constituted by a stepper motor 406 and a pointer 407. The stepper motor 406 moves the pointer 407 in response to data of cooling water temperature. Between each stepper motor and each pointer, there is disposed a dial plate (not shown) provided with scales, numerals, letters, or symbols to complete the meter.

In the combination meter, the vehicle speed meter 402 is connected to an infrared receiver element 414 via a stepper motor driver and infrared commutation IC 415; the tachometer 405 is connected to an infrared receiver element 416 via a stepper motor driver and commutation IC 417; the fuel meter 408 is connected to an infrared receiver element 418 via a stepper motor driver and infrared commutation IC 419; and the water temperature meter 411 is connected to an infrared receiver element 420 via a stepper motor driver and infrared commutation IC 421.

The combination meter also has a control module 422 attached on a rear surface 1b of the indication board 430. The control module 422 includes a base board on which there are disposed an IC 424 (including an interface IC 424b, a micro computer IC 424c, and an infrared commutation IC 424d) and an infrared emitting element 425 connected to each other. The IC 424 has an interface IC 424b, a micro computer IC 424c, and an infrared commutation IC 424d. The control module 422 is detachably mounted on the indicator board 401 with two fasteners 423.

In FIG. 12, an input terminal 424a receives values, for example of serial data, measured by various sensors (not shown) in regard to vehicle speed, engine revolution speed, fuel temperature, and engine room temperature. The measured values are input in the micro computer IC 424c via the interface circuit 424b. The micro computer IC 424c processes the measured values to generate data having identification codes. The data is input into the infrared communication IC 424d and transmitted from the infrared emitting element 425 as infrared signals.

The infrared signals transmitted from the infrared emitting element 425 are received by infrared receiver elements 414, 416, 418, and 420 to be supplied into the stepper motor driver and infrared commutation ICs 415, 417, 419, and 421 of the stepper motors. Each of stepper motor driver and infrared commutation ICs 415, 417, 419, and 421 selectively provides each data of vehicle speed, engine revolution speed, fuel quantity, and engine room temperature to each of the vehicle speed meter 402, the tachometer 405, the fuel meter 408, and the water temperature meter 411 together with an identification code.

Thus, the control module 422 is a control section that controls the various types of meters indicating measured values of the vehicle. The control module control module 422 is commonly used for the meters. The control module 422 outputs infrared commutation signals. On the indicator board 401, there are mounted the infrared receiver elements and the infrared commutation ICs of the meters.

The stepper motors 403, 406, 409, and 412 of the vehicle speed meter 402, the tachometer 405, the fuel meter 408, and the water temperature meter 411 are respectively connected to the stepper motor driver and infrared commutation ICs 415, 417, 419, and 421, so that the meters are controlled in response to the infrared signals supplied from the control module 422.

FIGS. 13 and 14 are respectively a block diagram and a general constitutional view of a combination meter proposed in Japanese patent application No. 2002-142720. In FIG. 13, the combination meter has a plurality of display units 500 and a control unit 600. The display unit 500 is provided with a receiver 511 for receiving measurement information showing a condition of the vehicle and a driving control device 530 for controlling a driving device 540 in response to the measurement information supplied from the display side receiver 511. The control unit 600 is provided with a transmitter 631 transmitting the measurement information to the plurality of display units 500 and a control device 611a for controlling transmission of the transmitter 631, an additional information storing device 614, a receiver 633, and a warning device 640.

The display unit 500 further has a response signal generating device 550a, a responding device 550b, and a transmitter 514. The response signal generating device 550a generates driving information for the driving device 540 in response to reception of the measurement information. The display side transmitter 514 transmits the driving information to the control unit 600. The control unit 600 further has a receiver 633 and a decision device 611b. The receiver 633 receives the driving information supplied from the display side transmitter 514. The decision device 611b determines whether the driving device 540 can be controlled or not based on comparison of the driving information received by the receiver 633 with the measurement information transmitted from the control device 611a. The control device 611a operates based on the determination of the decision device 611b.

As shown in FIG. 14, the display units 500 correspond to a vehicle speed meter, a tachometer indicating engine revolution speeds, a fuel meter indicating a remaining fuel quantity, a temperature meter indicating an engine room temperature, etc. The control unit 600 controls indication of all the display units 500.

The combination meters disclosed or proposed as mentioned above have configurations different from each other. However, each of the combination meters has a system configuration designed specifically for each car maker or for each type of cars. Thus, the combination meter requires a special design for each application, increasing a development cost. Or, minimization of the development cost decreases flexibility of meter design. Furthermore, when multi-display design with LEDs is applied for a combination meter, users cannot select freely the design of the combination meter, because the meter is specifically designed for each car.

In view of the above-mentioned situation, the present invention provides a vehicle-mounted meter system having a standardized common part regardless of car types to decrease a manufacturing cost and to improve design flexibility for customization of users.

SUMMARY OF THE INVENTION

A vehicle-mounted meter system of a first aspect of the invention includes:

an inputting and outputting circuit for data measured to show a condition of the vehicle, a control circuit for controlling the system as a whole and for procession of the data, the control circuit separated from the data inputting and outputting circuit, a meter main body having at least one measured value indication device a driving device for the indication device, and a control unit detachably attached to the meter main body.

The data inputting and outputting circuit is arranged on the meter main body, and the control circuit is arranged on the control unit.

A vehicle-mounted meter system of a second aspect of the invention includes:

an inputting and outputting circuit for data measured to show a condition of the vehicle, a control circuit for controlling the system as a whole and for procession of the data, the control circuit separated from the data inputting and outputting circuit, a meter main body having at least one measured value indication device and a driving device for the indication device, and a control unit detachably attached to the meter main body.

The data inputting and outputting circuit is arranged on the control unit, and the control circuit is arranged on the meter main body.

In the first and second aspect of the invention, preferably, the meter main body has a random bus structure corresponding to the data inputting and outputting circuit, and the bus structure has a buffer through which communication is allowed between the data inputting and outputting circuit and the control circuit. Thereby, signals are smoothly transmitted between the meter main body and the control circuit.

A vehicle-mounted meter system of a third aspect of the invention includes:

a meter main body having at least one measured value indication device and a driving device for the indication device, the measured value indication device showing a measured data of a condition of an automotive vehicle, and a control unit for controlling the system as a whole and for processing the measured data, the control unit detachably mounted on the meter main body.

The control unit has a memory and a control circuit, the memory storing and rewriting a software program to control the system as a whole and to process the measured data, the control circuit operated by the software program.

A vehicle-mounted meter system of a fourth aspect of the invention includes:

a meter main body having an inputting and outputting circuit for data measured by various types of sensors to know a condition of the vehicle, at least one measured value indication device for indicating the measured data, and a driving device for the indication device, and a control unit for controlling the system as a whole and for processing the measured data, the control unit detachably mounted on the meter main body.

The control unit has a memory and a control circuit, the memory used for storing and rewriting a software program to control the system as a whole and to process the measured data, the control circuit operated by the software program.

A vehicle-mounted meter system of a fifth aspect of the invention includes:

a meter main body having at least one measured value indication device and a driving device for the indication device, the measured value indication device showing a measured data of a condition of the vehicle, and a control unit detachably mounted on the meter main body.

The control unit has a data inputting and outputting circuit and a memory, the data inputting and outputting circuit transmitting data measured by various types of sensors to know a condition of the vehicle, the memory used for storing and rewriting a software program to control the system as a whole and to process the measured data. The meter main body has a control circuit operated by the software program so that the control circuit controls the system as a whole and to process the measured data.

Preferably, wire or wireless signal transmission is applied between the meter main body and the control unit.

Preferably, the control unit is a card-typed one, which can be handled with ease.

Preferably, the card-typed unit is a PC card in which a software program can be easily rewritten by a computer.

In the first and second aspects of the invention, the data inputting and outputting circuit is arranged on the meter main body as an independent circuit, while the control circuit is arranged on the control unit detachably attached to the meter main body. Thus, the circuit board mounted on the meter main body is simplified in layout without a control circuit, decreasing a manufacturing cost. Furthermore, the control unit separately arranged from the meter main body, allowing standardized multi-types of control units having different functions even for a combination meter of a higher quality.

In the third to fifth aspects of the invention, vehicle-mounted meter systems are designed so as to have a common part or device to decrease a development cost of the vehicle-mounted meter systems. Furthermore, the meter main body can have an indication pattern to comply with user's request, and many types of vehicle-mounted meter systems even of a high grade or design can be provided with a less cost.

BRIEF DESCRIPTION OF THE DRAWINGS

FIG. 13 is a block diagram showing a general configuration of a vehicle-mounted combination meter precedently proposed by the same applicant as the present application.

DETAILED DESCRIPTION OF THE PREFERRED EMBODIMENTS

Referring to the accompanied drawings, embodiments of a vehicle-mounted meter system according to the present invention will be discussed.

Figure 1:
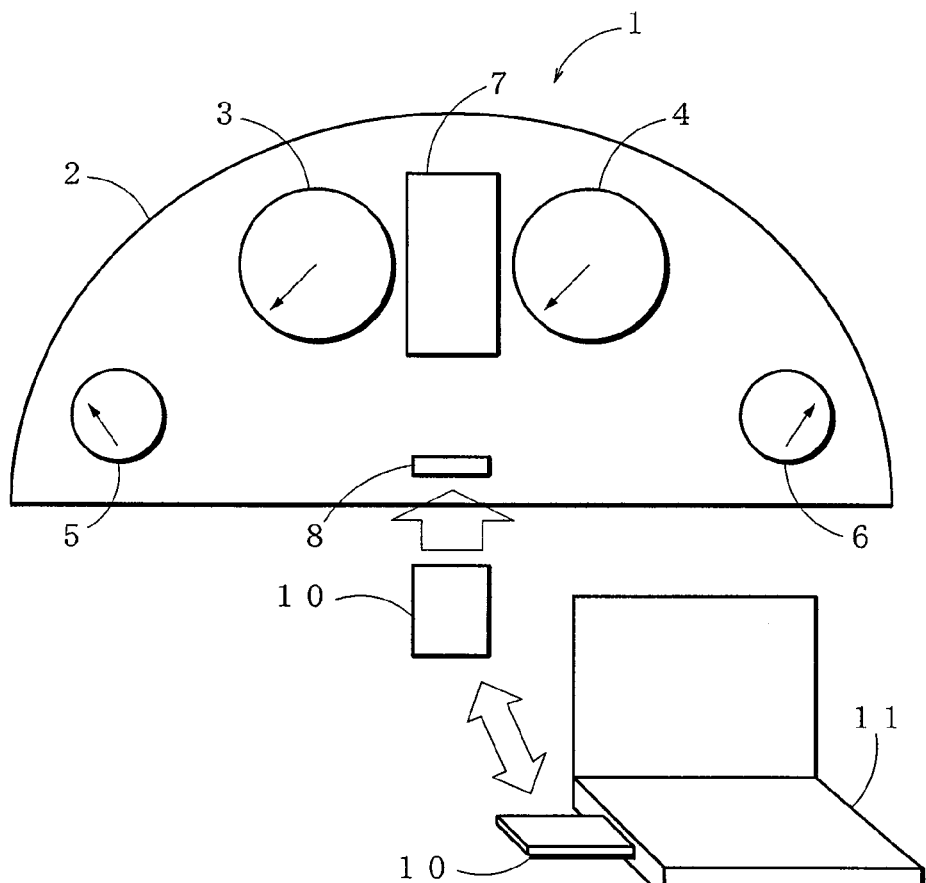
FIG. 1 is a general constitutional view showing a vehicle-mounted meter system according to the present invention.

FIG. 1 is a general constitutional view showing a vehicle-mounted meter system according to the present invention. A vehicle-mounted meter system 1 according to the present invention has a combination meter main body (meter unit) 2. In a front side of the combination meter unit 2, there are arranged a plurality of meters and a display 7 of LED (liquid crystal display) or the like. The meters includes a vehicle speed meter 3, a tachometer 4 indicating an engine revolution speed, and a fuel meter 5 indicating a remaining quantity of a fuel like gasoline. Furthermore, in the front side of the combination meter unit 2, a connector 8 is provided under the display 7 for detachable connection with a control unit 10.

The control unit 10 is a card type one such as a PC card of an ATA standard. The PC card complies with a PC card standard agreed by JEIDA and PCMCIA. The PC card is an information medium applicable to a compact information unit like a note-type personal computer 11. The PC card is the same size as a credit card. ATA (AT attachment) is a standard of ANSI (American National Standards Institute), which is associated with E-IDE (Enhanced Intelligent Drive Electronics) standard of a hard disk. Hereafter, the control unit 10 is called as PC card 10.

The PC card 10 serves to control operation of the combination meter unit 2 as a whole. The PC card 10 is inserted into the connector 8 to enable indication of each meter of the combination meter unit 2. The PC card 10 is drawn out from the connector 8 and can be rewritten in specifications selectable for users by a personal computer 11. Meanwhile, basic functions of the meters are sets not to be rewritten.

Figure 2:
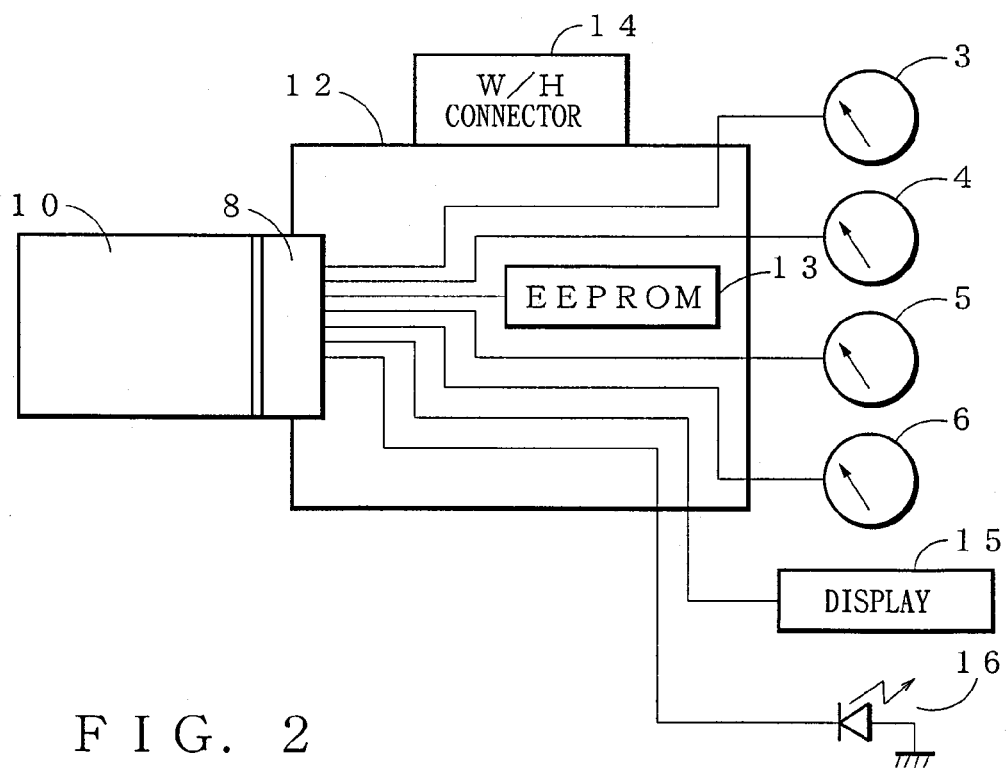
FIG. 2 is a general configuration showing a vehicle-mounted meter system particularly with electrical configuration according to the present invention.

FIG. 2 is a general configuration showing a vehicle-mounted meter system particularly in electrical configuration according to the present invention. In a rear side of the combination meter unit 2, there is arranged a mother board 12. The mother board 12 has a connector 8, a wiring harness connector 14, and an EEPROM (Electrically Erasable, Programmable, Read-only Memory) 13. The mother board 12 also has circuits for electrical connection from the connector 8 to the vehicle speed meter 3, the tachometer 4, the fuel meter 5, the water temperature meter 6, the EEPROM 13, a display 15, and an LED 16.

Figure 3:
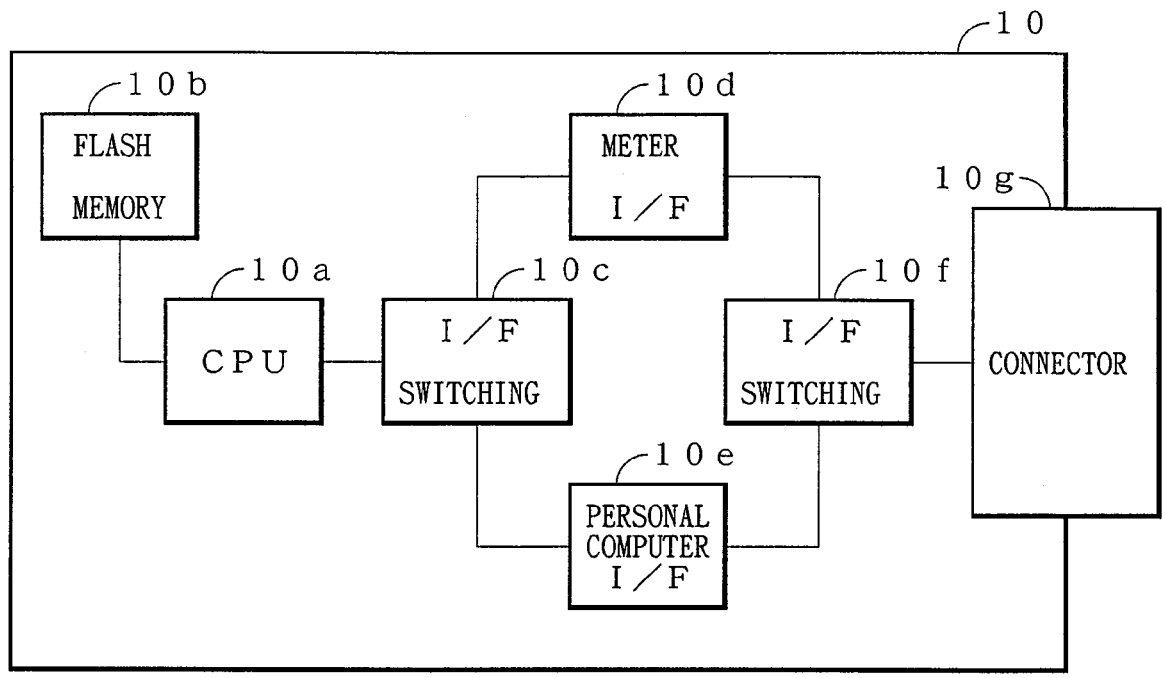
FIG. 3 is a block diagram showing an electrical configuration of a PC card according to the present invention.
Figure 14:
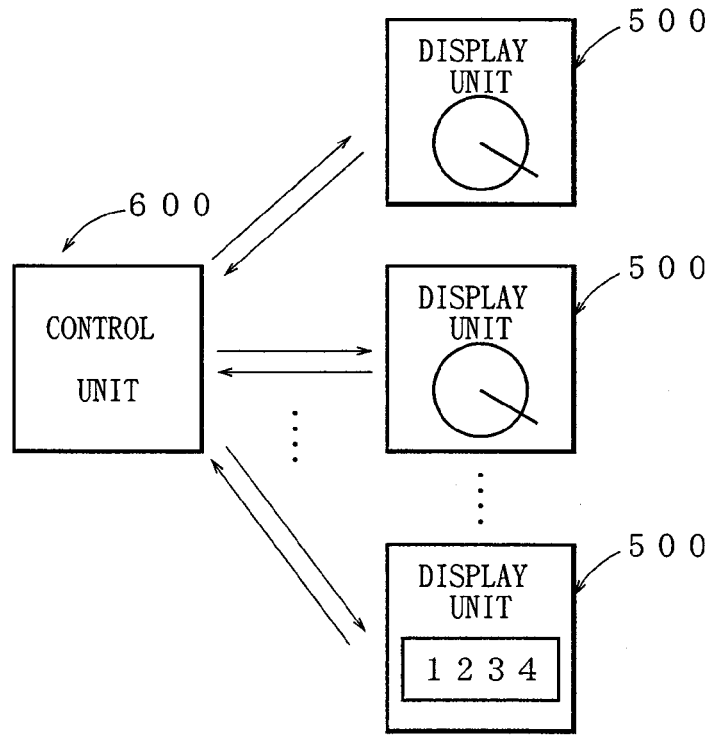
FIG. 14 is a block diagram showing the combination meter of FIG. 13.

FIG. 3 is a block diagram showing an electrical configuration of the PC card 10 according to the present invention. The PC card 10 includes a micro computer (hereafter called as CPU) 10a of a control means, a flush memory 10b of a storage means, interface switching circuits 10c, 10f, a meter interface circuit 10d, a PC interface circuit 10e, and a connector 10g. The flash memory 10b stores and rewrites functional specifications of the combination meter unit 2 with a software program so that the CPU 10a controls operation of the meter system 1 as a whole. The operation includes indication of each meter.

The PC card 10 can switch interface circuits for the personal computer 11 and the combination meter unit 2 by a hand switch or an automatic switch. The automatic switch operates in response to insertion of the card into the connector 8 or to reception of associated code signals.

Insertion of the PC card 10 into the connector 8 of the combination meter unit 2 switches the interface switching circuits 10c, 10f to connect to the meter interface circuit 10d, so that the CPU 10a can control each meters. Disengagement of the PC card 10 from the connector 8 switches the interface switching circuits 10c, 10f to correspond to the PC interface circuit 10e, and the PC card 10 is received in a connector of the personal computer 11 so that the personal computer 11 can modify data indication of each meter.

Thus, the flash memory 10b of the PC card 10 can be rewritten for another meter function so that the same PC card 10 can be applied to another vehicle-mounted meter system. This reduces a manufacturing cost and shortens a delivery time of vehicle-mounted meter system, providing an advantage in market competition of the vehicle-mounted meter system. Users can select desirably modifications or functional developments of meter display patterns, improving the vehicle-mounted meter system in quality.

Figure 4:
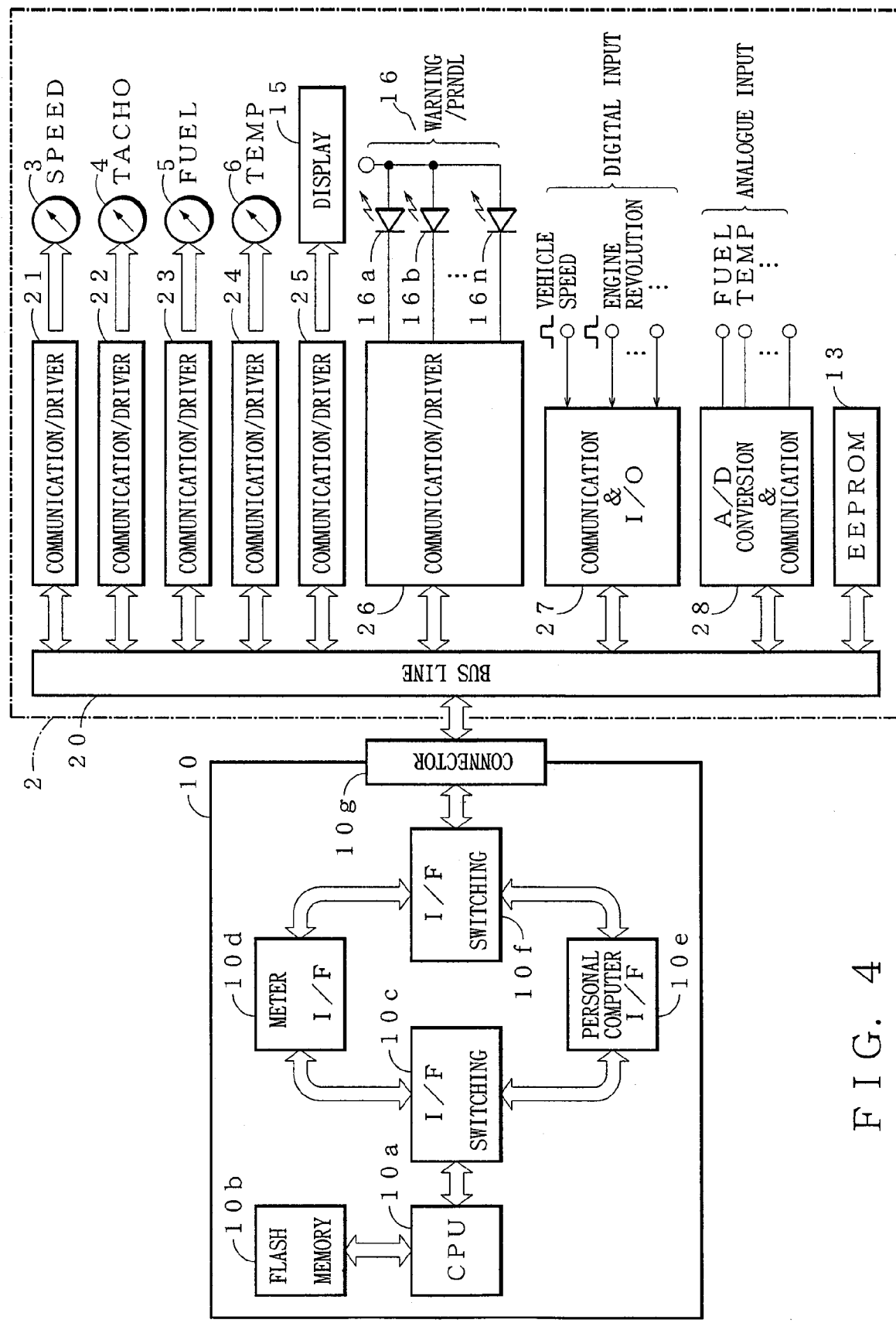
FIG. 4 is a block diagram showing a detailed electrical configuration of a vehicle-mounted meter system according to the present invention.

FIG. 4 is a block diagram showing a detailed electrical configuration of a vehicle-mounted meter system according to the present invention. In FIG. 4, a PC card 10 is the same as that of FIG. 3. The combination meter unit 2 has a bus line 20 for signal transmission with the connector 10g of the control unit 10, commutation and driving circuits 21 to 26 communicating with the bus line 20, a communication I/O circuit 27, an A/D conversion and communication circuit 28, and an EEPROM 13.

The communication and driver circuit 21 supplies vehicle speed data to drive the vehicle speed meter 3. The communication and driver circuit 22 supplies engine revolution speed data to drive the tachometer 4. The communication and driver circuit 23 supplies remaining fuel quantity data to drive the fuel meter 5. The communication and driver circuit 24 supplies cooling water temperature data to drive the temperature meter 6. The communication and driver circuit 25 supplies subsidiary information to the display 15. The communication and driver circuit 26 supplies data for various warnings and for operation step indication of an automatic shift lever to LEDs 16a to 16n.

The communication I/O circuit 27 transmits measured data to the bus line 20. The data includes signals measured by various types of desirably arranged sensors. The data is converted in digital data with regard to vehicle speed (SPD), engine revolution speed (TACHO), etc. The data transmitted from the communication I/O circuit 27 is input to the CPU 10a from the bus line 20 via the connector 10g, the interface switching circuit 10f, the meter interface circuit 10d, and the interface switching circuit 10c. The data is processed to be changed into indication data. The indication data of vehicle speed is transmitted from the CPU 10a to the communication and driver circuit 21 via the interface switching circuit 10c, the meter interface circuits 10d, the interface switching circuit 10f, the connector 10g, and the bus line 20. The indication data of engine revolution speed is transmitted from the CPU 10a to the communication and driver circuit 22 via the interface switching circuit 10c, the meter interface circuit 10d, the interface switching circuit 10f, the connector 10g, and the bus line 20.

The A/D conversion and communication circuit 28 converts measured data to transmit it to the bus line 20. The data includes information of remaining fuel quantity (FUEL) and cooling water temperature (TEMP). The data transmitted from the A/D conversion and communication circuit 28 is input to the CPU 10a from the bus line 20 via the connector 10g, the interface switching circuit 10f, the meter interface circuit 10d, and the interface switching circuit 10c. The data is processed to become data for indication.

The indication data of remaining fuel quantity (FUEL) is transmitted from the CPU 10a to the communication and driver circuit 23 via the interface switching circuit 10c, the meter interface circuit 10d, the interface switching circuit 10*f*, the connector 10*g*, and the bus line 20. The indication data of cooling water temperature (TEMP) is transmitted from the CPU 10*a* to the communication and driver circuit 24 via the interface switching circuit 10*c*, the meter interface circuit 10*d*, the interface switching circuit 10*f*, the connector 10*g*, and the bus line 20.

Next, operation of thus configured vehicle-mounted meter system 1 will be discussed. The flash memory 10*b* of the PC card 10 stores a basic data and a software program to operate meters arranged in the combination meter unit 2. The basic data and the software program are preliminarily stored in the PC card 10 from the personal computer 11 (FIG. 1) via the PC interface circuit 10*e*, while the PC card 10 is received in the personal computer 11. The personal computer 11 can switch the interface switching circuits 10*c*, 10*f* toward the PC interface circuit 10*e*.

Then, the PC card 10 having stored the basic data and the software program is inserted in the connector 8 of the combination meter unit 2. The insertion of the PC card 10 can automatically switch the interface switching circuits 10*c* and 10*f* toward the meter interface circuit 10*d*.

Consequently, digital input signals of vehicle speed, engine revolution speed, remaining fuel quantity, cooling water temperature, etc. are transmitted into the CPU 10*a* of the PC card 10 by means of multiple communication via the bus line 20 and the communication I/O circuit 27 or the A/D conversion and communication circuit 28. Similarly, subsidiary information and warning signals showing vehicle conditions are transmitted into the CPU 10*a* of the PC card 10 by means of multiple communication from the connector 10*g* via the bus line 20 and the communication and driver circuit 26.

The CPU 10*a* processes the digital input signals of vehicle speed, engine revolution speed, remaining fuel quantity, cooling water temperature, etc. The processed signals are output respectively to the communication and driver circuits 21 to 24 via the bus line 20 for indication of each of the meters 3 to 6. The subsidiary information showing vehicle conditions is processed by the CPU 10*a*, and the processed date is output to the communication and driver circuit 25 via the bus line 20 for indication in the display 15. The warning signals are processed by the CPU 10*a*, and the processed date is output to the communication and driver circuit 26 via the bus line 20 so that each of LEDs 16*a* to 16*n* lights for warning in response to each of the signals.

Thus configured vehicle-mounted meter system 1 shown in FIG. 4 has the PC card 10 (control unit) provided with control circuits and input/output circuits. The PC card 10 is electrically connected to the drivers and I/O circuits arranged in the combination meter unit 2. Some of the measured signals are transmitted to some of the meters as digital ones via the communication I/O circuit 27, while the others are transmitted to the other meters via the A/D converter and communication circuit 28.

Figure 5:
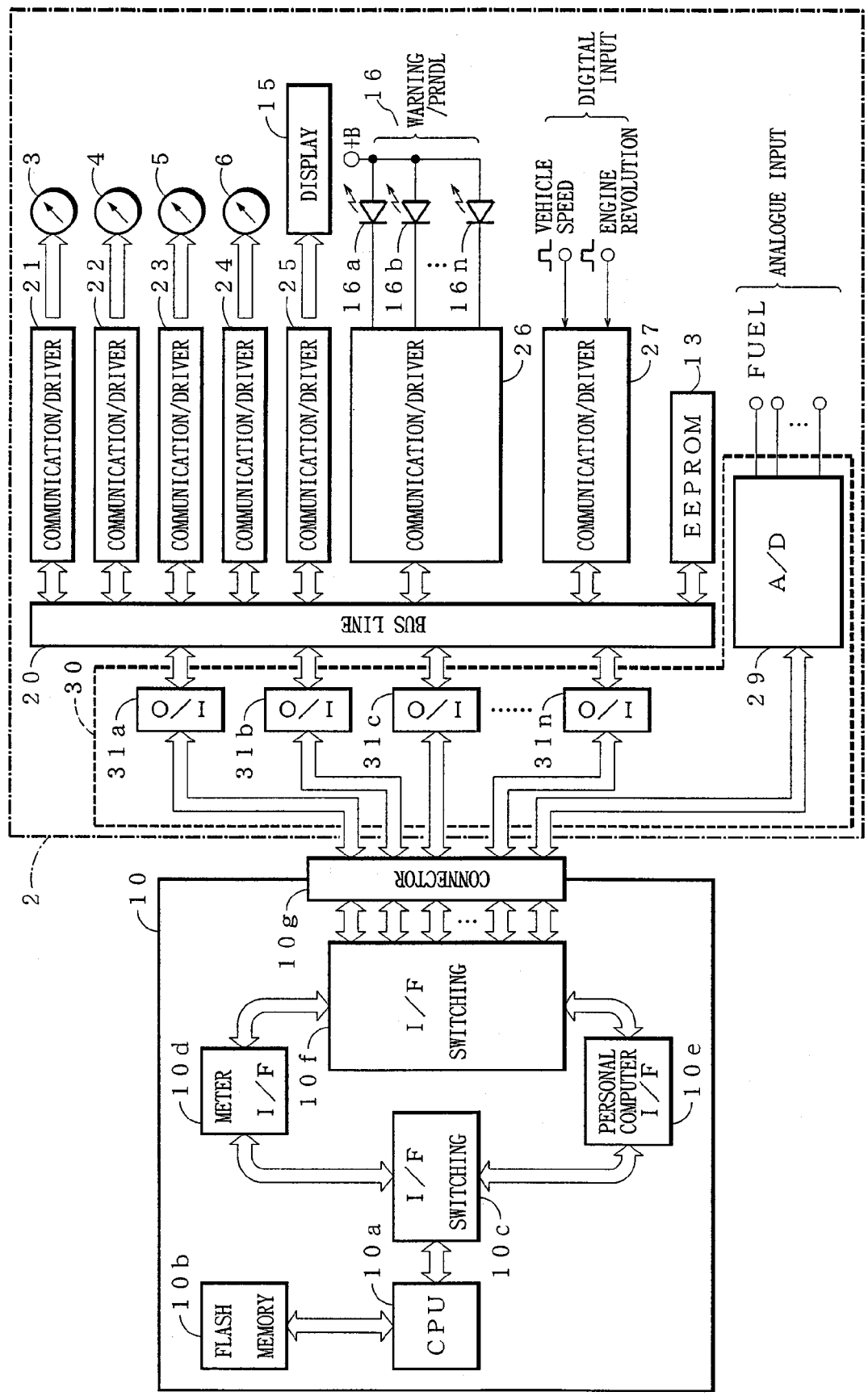
FIG. 5 is a block diagram showing a detailed electrical configuration of another vehicle-mounted meter system according to the present invention.

FIG. 5 is a block diagram showing a detailed electrical configuration of another vehicle-mounted meter system according to the present invention. In FIG. 5, a control unit 10 has a configuration the same as that of FIG. 3. The combination meter unit 2 has an I/O system 30 for signal transmission with the connector 10*g* of the control unit 10, a bus line 20 of a random bus construction corresponding to I/O circuits, commutation and driving circuits 21 to 27, and an EEPROM 13.

The I/O system 30 has I/O circuits 31*a* to 31*n* and an A/D converter 29 to serve as input/output means. The I/O circuits 31*a* to 31*n* transmit signals between the connector 10*g* and the bus line 20. The I/O circuits 31*a* to 31*n* also output driving signals to the communication and driver circuits 21 to 26 and input digital signals to the connector 10*g* via the communication I/O circuit 27. The A/D converter 29 converts analogue signals of remaining fuel quantity, cooling water temperature, etc. to digital ones to supply them to the connector 10*g*.

Thus configured vehicle-mounted meter system 1 shown in FIG. 5 has the PC card 10 (control unit) provided with control circuits (CPU 10*a*) and the user setting memory 10*b*. The vehicle-mounted meter system 1 also has the combination meter unit 2 provided with the I/O system 30. The I/O system 30 includes the A/D converter 29 and the I/O circuits 31*a* to 31*n*. The I/O system 30 is positioned in the combination meter unit 2 and separated from the CPU 10*a* of the control unit 10, so that the CPU 10*a* can have more flexibility than that of FIG. 4.

Figure 6:
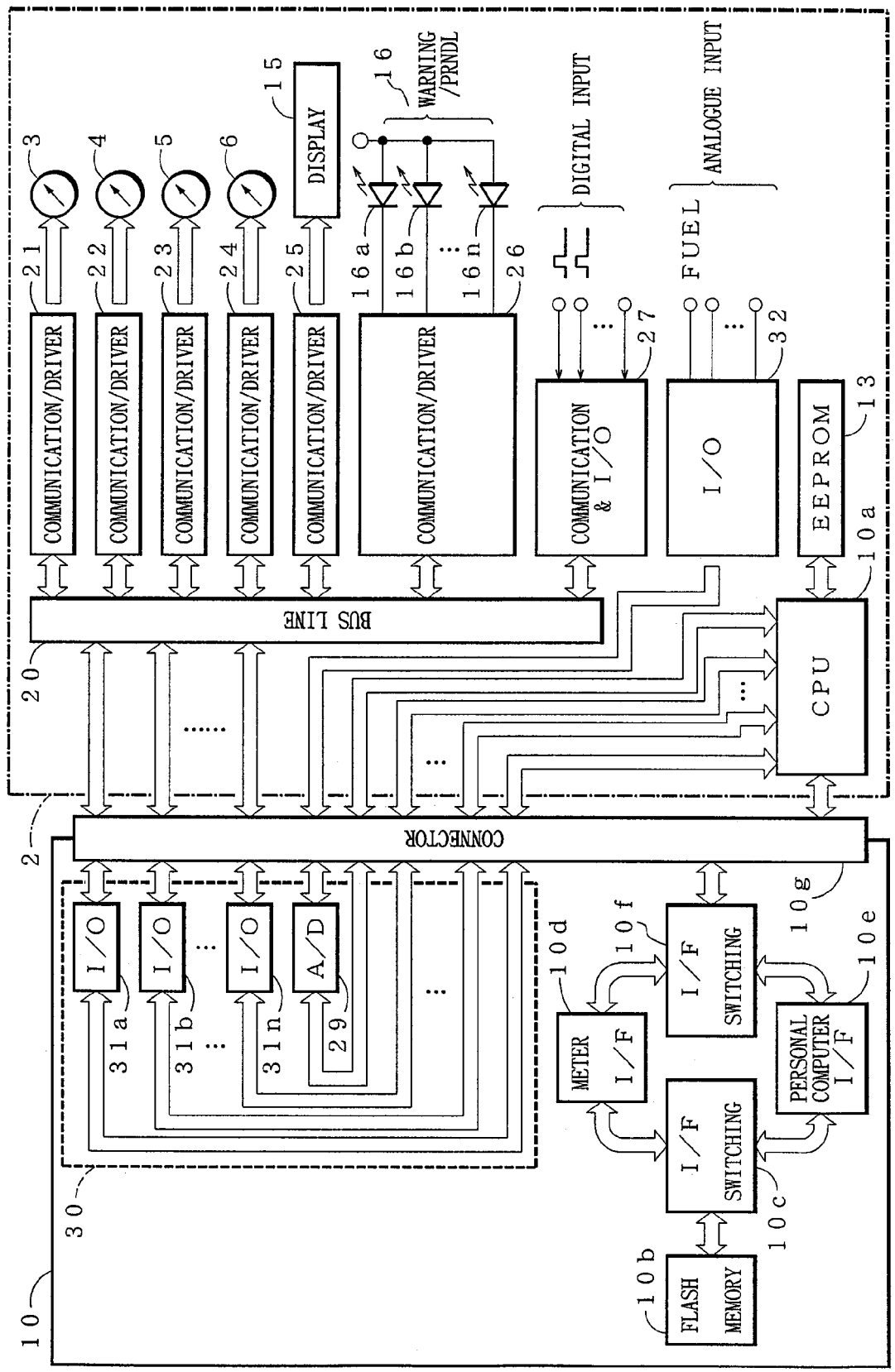
FIG. 6 is a block diagram showing a detailed electrical configuration of further another vehicle-mounted meter system according to the present invention.

FIG. 6 is a block diagram showing a detailed electrical configuration of further another vehicle-mounted meter system according to the present invention. In FIG. 6, a control unit 10 has an I/O system 30 in addition to the PC card of FIG. 3. A combination meter unit 2 has a CPU 10*a*, a bus line 20, driving circuits 21 to 26, a communication I/O circuit 27, an I/O circuit 32, a vehicle speed meter 3, and an EEPROM 13.

The I/O system 30 includes I/O circuits 31*a* to 31*n* and an A/D converter 29. The I/O circuits 31*a* to 31*n* transmits signals between the connector 10*g* and the bus line 20. The A/D converter 29 converts analogue signals of remaining fuel quantity, cooling water temperature, etc. to digital ones to supply them to the connector 10*g*.

That is, the vehicle-mounted meter system shown in FIG. 6 has the card unit 10 provided with I/O circuits.

In the aforementioned embodiments, the vehicle-mounted meter systems are designed so as to have a common part or device to decrease a development cost of the vehicle-mounted meter systems. Furthermore, the combination meters can have indication patterns to comply with users' requests, and many types of vehicle-mounted meter systems even of a high grade or design can be provided with a less cost.

The present invention is not limited in the embodiments discussed above but may be modified variously.

For example, wireless transmission may be applied between the combination meter unit 2 and the control unit 10 in place of the wire transmission of the embodiments discussed above.

Figure 7:
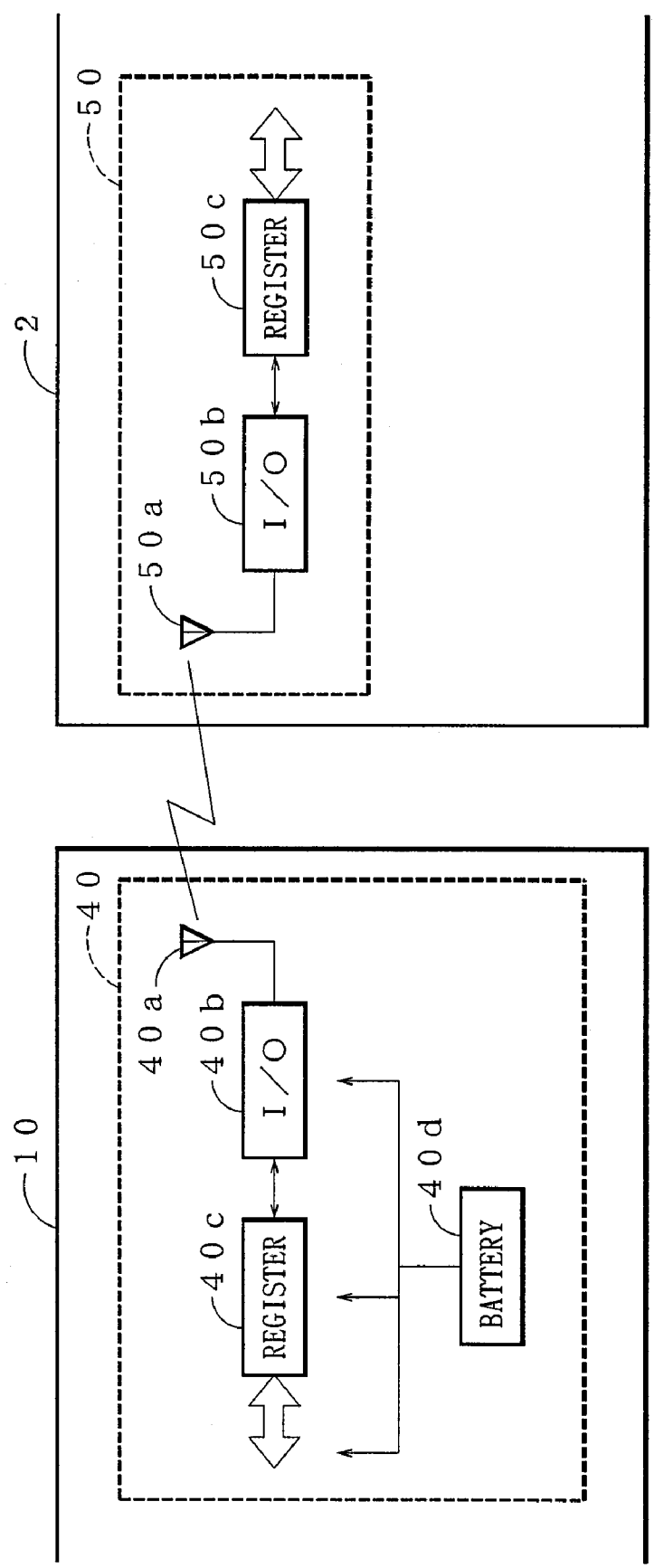
FIG. 7 is a block diagram showing a detailed electrical configuration of further another vehicle-mounted meter system according to the present invention.
Figure 8:
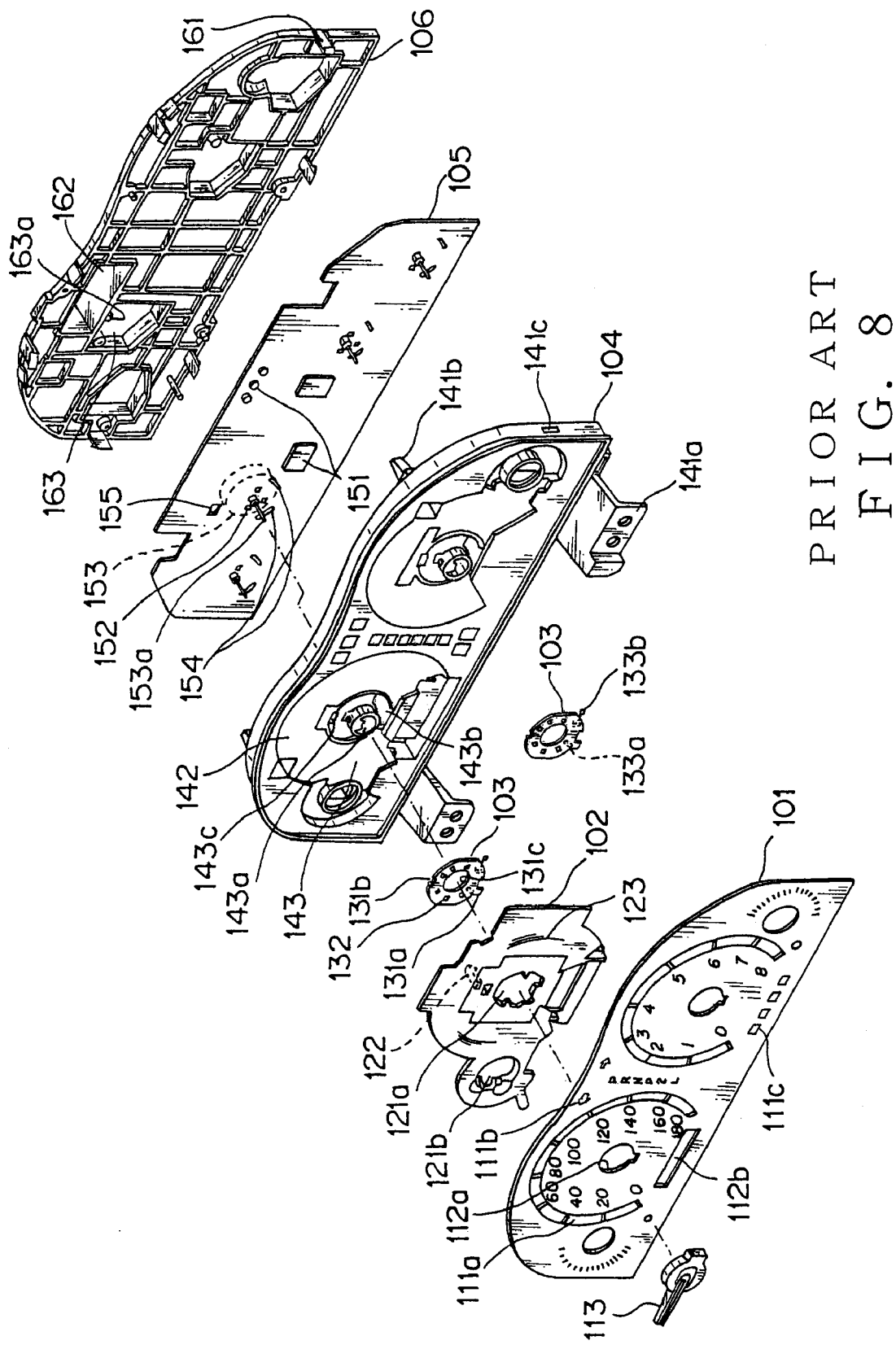
FIG. 8 is an exploded perspective view showing a conventional combination meter mounted in an automotive vehicle.
Figure 9:
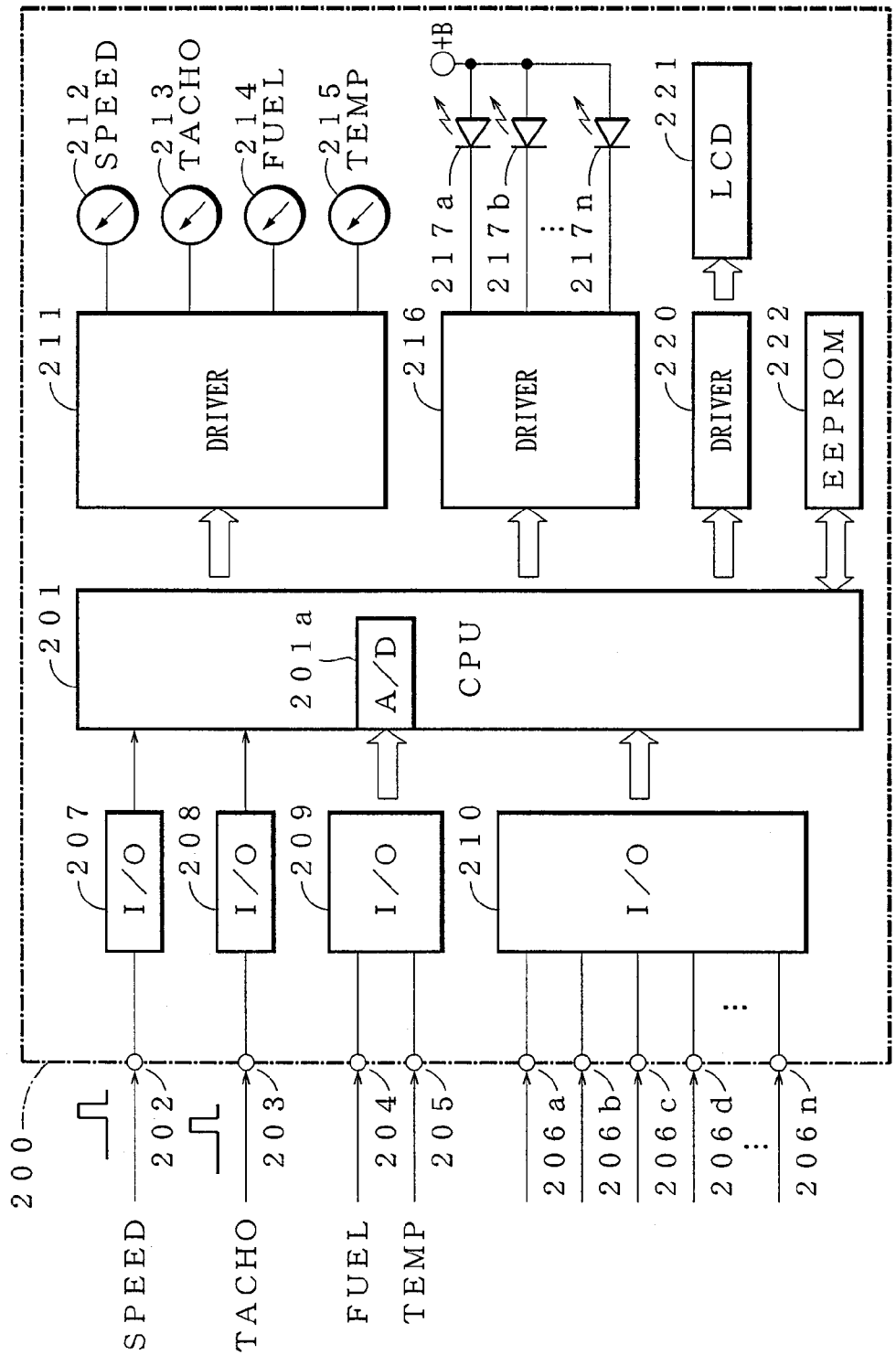
FIG. 9 is a block diagram showing a general electrical configuration of a vehicle-mounted conventional combination meter.
Figure 10:
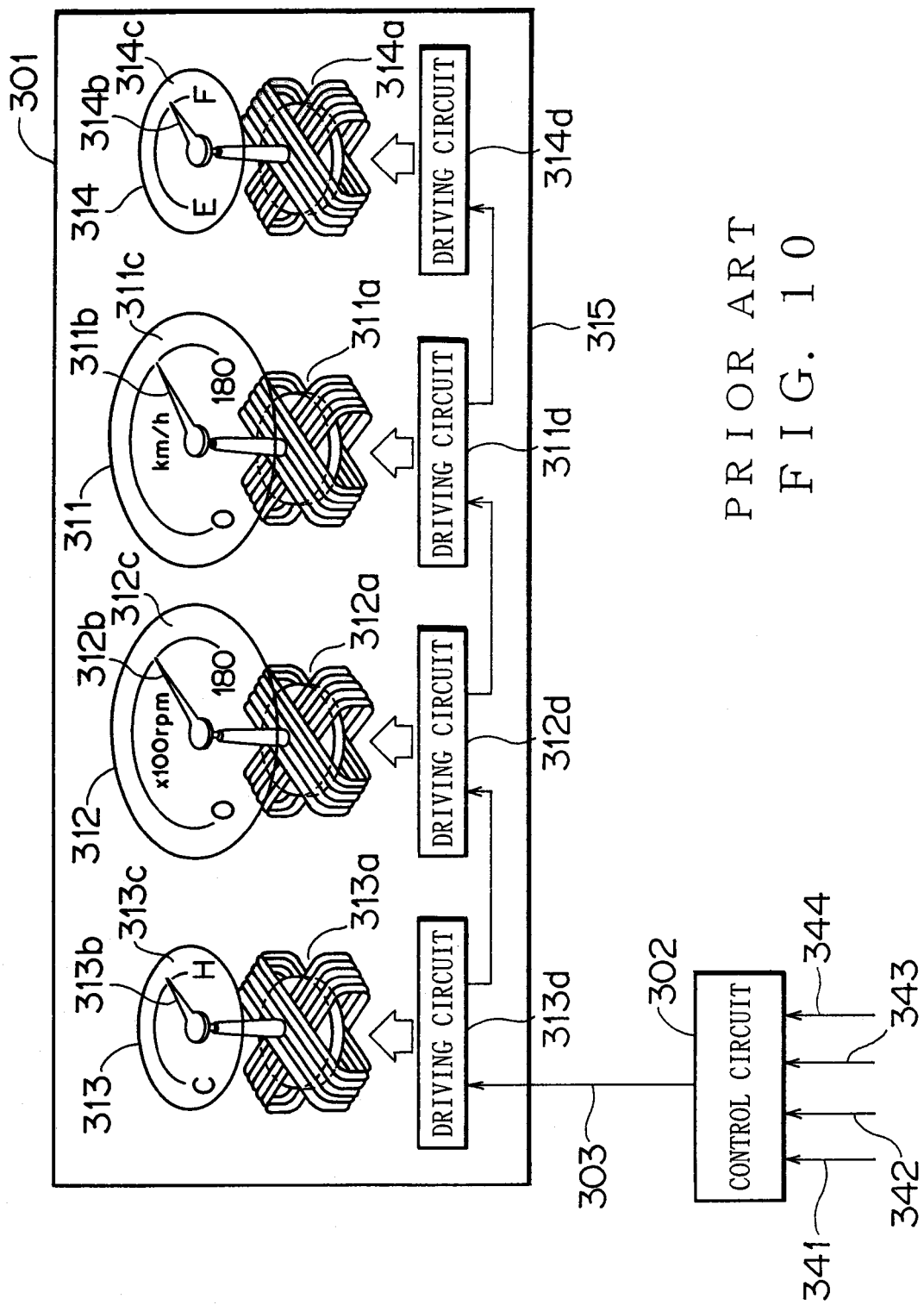
FIG. 10 is an illustration showing another conventional combination meter mounted in an automotive vehicle.
Figure 11:
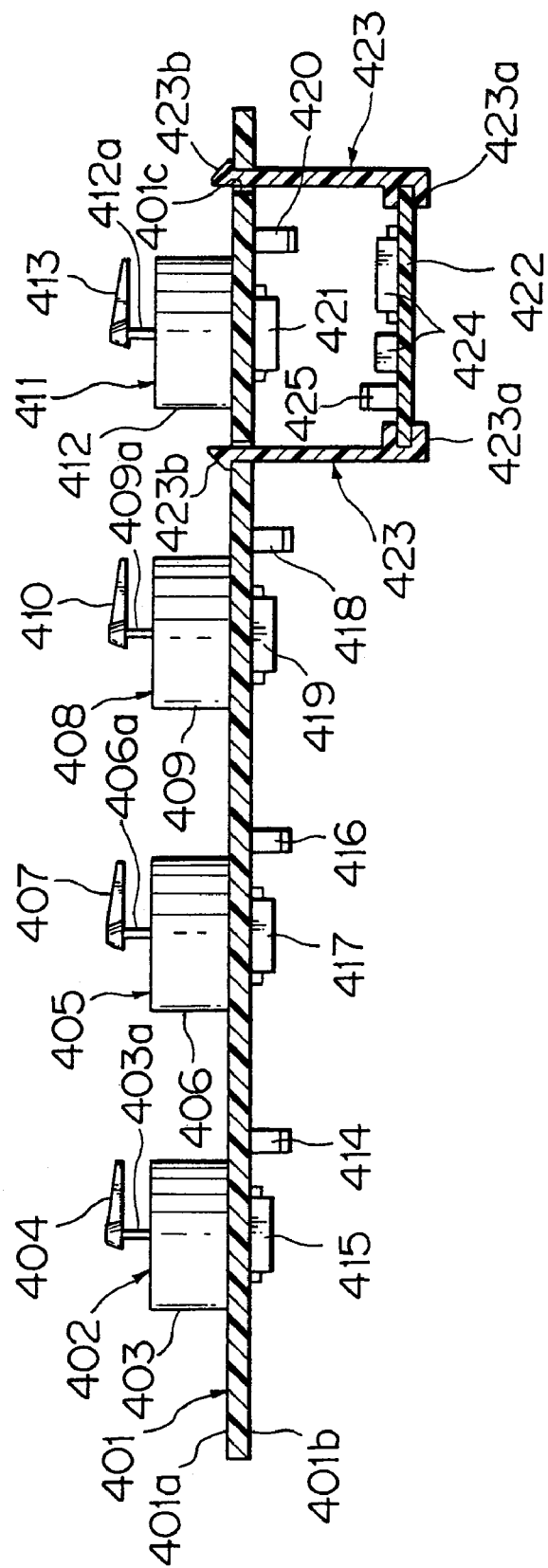
FIG. 11 is a sectional view showing a constitution of further another conventional combination meter mounted in an automotive vehicle.
Figure 12:
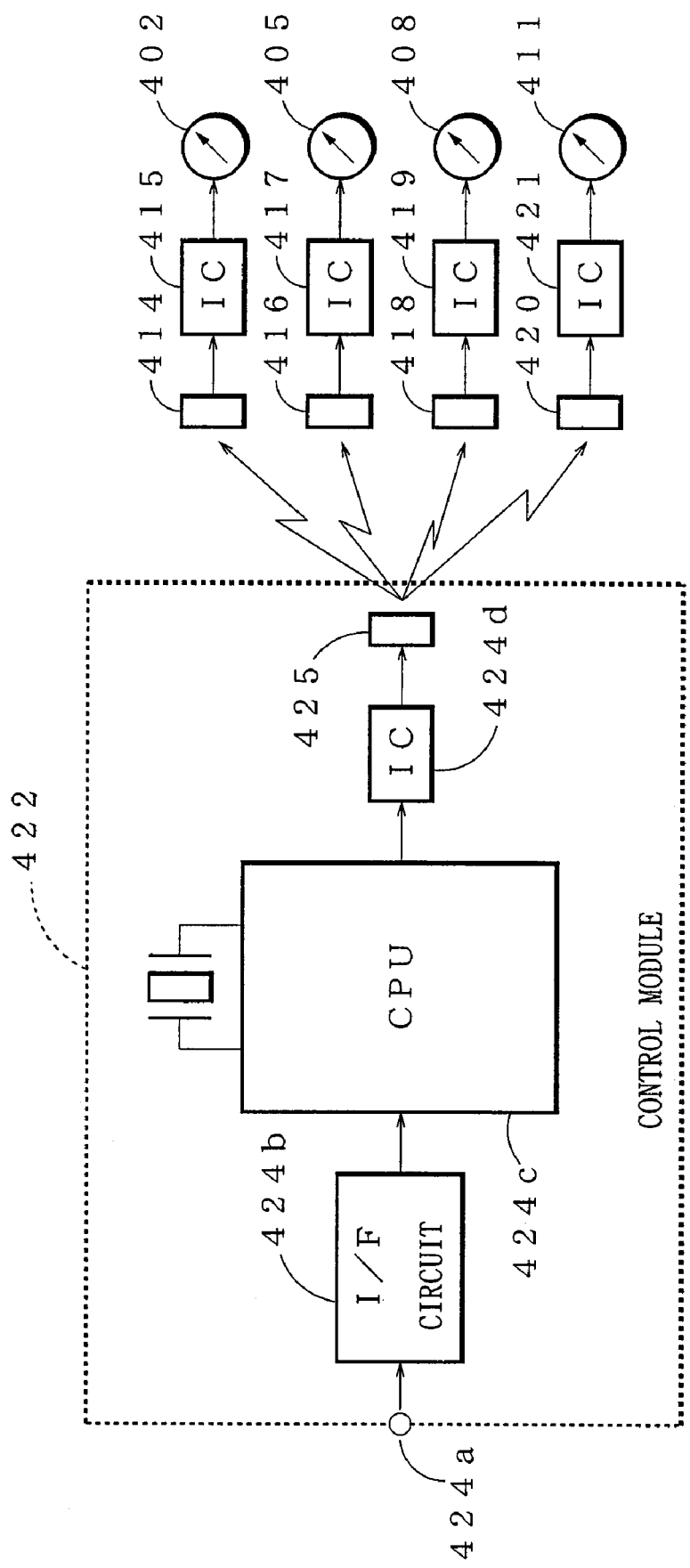
FIG. 12 is a block diagram showing the conventional combination meter of FIG. 11.

FIG. 7 is a block diagram showing a detailed electrical configuration of further another vehicle-mounted meter system according to the present invention. In FIG. 7, a control unit 10 has a radio transmission section 40 in place of the connector 10*g*, and the combination meter unit 2 has a radio transmission section 50 in place of the connector 8. The radio transmission section 40 includes an antenna 40*a*, an I/O circuit 40*b* with modulation capability, a register 40*c*, and a battery 40*d* such as a solar cell. The radio transmission section 50 includes an antenna 50*a*, an I/O circuit 50*b* with modulation capability, and a register 50*c*.

In this configuration, wireless transmission supplies various signals from the combination meter unit 2 to the control unit 10 via the register 50*c*, the I/O circuit 50*b*, and the antenna 50*a*. The transmitted signals are received by the radio transmission section 40 of the control unit 10 to be delivered to a CPU 10*a* via the I/O circuit 40*b* and the register 40*c*.

Meanwhile, signals that have been processed by the CPU 10*a* return from the control unit 10 to the combination meter unit 2 via the register 40*c*, the I/O circuit 40*b*, and the antenna 40*a* by wireless transmission. The processed signals are received by the radio transmission section 50 of the combination meter unit 2 and then are supplied to each of the communication and driver circuits via the antenna 50*a*, the I/O circuit 50*b*, and the register 50*c*.

The wireless data transmission between the combination meter unit 2 and the control unit 10 allows the control unit control unit 10 to be freely positioned. The control unit 10 can advantageously handled when rewritten with a software program.

What is claimed is:

1. A vehicle-mounted meter system comprising:
   an inputting and outputting circuit for data measured to show a condition of the vehicle,
   a control circuit for controlling the system as a whole and for procession of the data, the control circuit separated from the data inputting and outputting circuit,
   a meter main body having at least one measured value indication device a driving device for the indication device, and
   a control unit detachably attached to the meter main body,
   wherein the data inputting and outputting circuit is arranged on the meter main body, and the control circuit is arranged on the control unit,
   wherein the control unit has a memory and a control circuit, the memory storing and rewriting a software program to control the system as a whole and to process the measured data, the control circuit operated by the software program.

2. The meter system recited in claim 1 wherein the meter main body has a random bus structure corresponding to the data inputting and outputting circuit, and the bus structure has a buffer through which communication is allowed between the data inputting and outputting circuit and the control circuit.

3. The meter system recited in claim 1 wherein wire or wireless signal transmission is applied between the meter main body and the control unit.

4. The meter system recited in claim 1 wherein the control unit is a card-typed one.

5. The meter system recited in claim 1 wherein the control circuit of the control unit includes a micro computer.

6. The meter system recited in claim 5 wherein the meter main body is a combination meter having a plurality of meters and a display, and the micro computer controls the plurality of meters and the display.

7. A vehicle-mounted meter system comprising:
   an inputting and outputting circuit for data measured to show a condition of the vehicle,
   a control circuit for controlling the system as a whole and for procession of the data, the control circuit separated from the data inputting and outputting circuit,
   a meter main body having at least one measured value indication device and a driving device for the indication device, and
   a control unit detachably attached to the meter main body,
   wherein the data inputting and outputting circuit is arranged on the control unit, and the control circuit is arranged on the meter main body,
   wherein the control unit has a memory and a control circuit, the memory storing and rewriting a software program to control the system as a whole and to process the measured data, the control circuit operated by the software program.

8. The meter system recited in claim 7 wherein the meter main body has a random bus structure corresponding to the data inputting and outputting circuit, and the bus structure has a buffer through which communication is allowed between the data inputting and outputting circuit and the control circuit.

9. The meter system recited in claim 7 wherein wire or wireless signal transmission is applied between the meter main body and the control unit.

10. The meter system recited in claim 7 wherein the control unit is a card-typed one.

11. The meter system recited in claim 7 wherein the control circuit of the control unit includes a micro computer.

12. The meter system recited in claim 11 wherein the meter main body is a combination meter having a plurality of meters and a display, and the micro computer controls the plurality of meters and the display.

13. A vehicle-mounted meter system comprising:
   a meter main body having at least one measured value indication device and a driving device for the indication device, the measured value indication device showing a measured data of a condition of an automotive vehicle, and
   a control unit for controlling the system as a whole and for processing the measured data, the control unit detachably mounted on the meter main body via connectors,
   wherein the control unit has a memory and a control circuit, the memory storing and rewriting a software program to control the system as a whole and to process the measured data, the control circuit operated by the software program.

14. The meter system recited in claim 13 wherein wire or wireless signal transmission is applied between the meter main body and the control unit.

15. The meter system recited in claim 13 wherein the control unit the is a card-typed one.

16. The meter system recited in claim 13 wherein the control circuit of the control unit includes a micro computer.

17. The meter system recited in claim 16 wherein the meter main body is a combination meter having a plurality of meters and a display, and the micro computer controls the plurality of meters and the display.

18. A vehicle-mounted meter system comprising:
   a meter main body having an inputting and outputting circuit for data measured by various types of sensors to know a condition of the vehicle, at least one measured value indication device for indicating the measured data, and a driving device for the indication device, and
   a control unit for controlling the system as a whole and for processing the measured data, the control unit detachably mounted on the meter main body via connectors,
   wherein the control unit has a memory and a control circuit, the memory for storing and rewriting a software program to control the system as a whole and to process the measured data, the control circuit operated by the software program.

19. The meter system recited in claim 18 wherein wire or wireless signal transmission is applied between the meter main body and the control unit.

20. The meter system recited in claim 18 wherein the control unit is a card-typed one.

21. The meter system recited in claim 18 wherein the control circuit of the control unit includes a micro computer.

22. The meter system recited in claim 21 wherein the meter main body is a combination meter having a plurality of meters and a display, and the micro computer controls the plurality of meters and the display.

* * * * *